(12) United States Patent
Kristensson et al.

(10) Patent No.: US 7,474,884 B2
(45) Date of Patent: *Jan. 6, 2009

(54) RECEIVER

(75) Inventors: Martin Kristensson, Helsinki (FI);
Bjorn Ottersten, Luxembourg (LU);
David Astély, Stockholm (SE)

(73) Assignee: Nokia Corporation, Espoo (FI)

( * ) Notice: Subject to any disclaimer, the term of this patent is extended or adjusted under 35 U.S.C. 154(b) by 5 days.

This patent is subject to a terminal disclaimer.

(21) Appl. No.: 11/519,426

(22) Filed: Sep. 11, 2006

(65) Prior Publication Data

US 2007/0129042 A1    Jun. 7, 2007

Related U.S. Application Data

(63) Continuation of application No. 10/296,964, filed as application No. PCT/SE01/01212 on May 30, 2001, now Pat. No. 7,107,031.

(30) Foreign Application Priority Data

May 31, 2000    (SE) .................................... 002029

(51) Int. Cl.
*H04B 1/10* (2006.01)
*H04B 7/185* (2006.01)
*H04L 27/08* (2006.01)
*H03D 1/04* (2006.01)
*H03D 1/106* (2006.01)
*H03K 5/01* (2006.01)
*H03K 6/04* (2006.01)
*H03B 1/10* (2006.01)
*H03L 1/00* (2006.01)
*H03L 25/08* (2006.01)
*H04J 1/12* (2006.01)
*H04J 3/10* (2006.01)
*H04J 15/00* (2006.01)

(52) U.S. Cl. .................. 455/296; 455/295; 375/346; 375/350; 370/201; 370/317

(58) Field of Classification Search ............... 455/296, 455/295; 375/346, 350; 370/317, 201
See application file for complete search history.

(56) References Cited

U.S. PATENT DOCUMENTS

| | | | | | |
|---|---|---|---|---|---|
| 4,862,483 | A | * | 8/1989 | Clark | 375/341 |
| 5,005,188 | A | * | 4/1991 | Clark | 375/341 |
| 5,428,647 | A | * | 6/1995 | Rasky et al. | 375/366 |
| 6,035,003 | A | * | 3/2000 | Park et al. | 375/326 |
| 6,084,919 | A | * | 7/2000 | Kleider et al. | 375/285 |
| 6,134,265 | A | * | 10/2000 | Long | 375/222 |
| 6,226,321 | B1 | * | 5/2001 | Michels et al. | 375/227 |

(Continued)

*Primary Examiner*—Nay Maung
*Assistant Examiner*—Andrew Wendell
(74) *Attorney, Agent, or Firm*—Foley & Lardner, LLP

(57) ABSTRACT

The present invention relates to a method for a digital receiver and a receiver exploiting second order statistics for adaptive co-channel interference rejection in wireless communication. It uses digitally I, in phase, and Q, quadrature, branches of a received transmitted signal as input to the receiver, a coarse synchronization and a coarse frequency offset compensation have being performed on the signal. It comprises a means for derotation, means for separation, means for filtering, means for estimating and means for detecting transmitted symbols in the received signal. The invention thereby improving co-channel rejection in wireless communication, thus making it possible to increase the number of communication channels for frequencies used.

44 Claims, 1 Drawing Sheet

U.S. PATENT DOCUMENTS

| | | | |
|---|---|---|---|
| 6,477,214 B1 * | 11/2002 | Fowler et al. | 375/350 |
| 6,590,932 B1 * | 7/2003 | Hui et al. | 375/232 |
| 6,621,857 B1 * | 9/2003 | Belotserkovsky et al. | 375/149 |
| 6,925,127 B1 * | 8/2005 | Dent | 375/260 |
| 2003/0193914 A1 * | 10/2003 | Lomp et al. | 370/335 |
| 2004/0234011 A1 * | 11/2004 | Lindoff et al. | 375/346 |

* cited by examiner

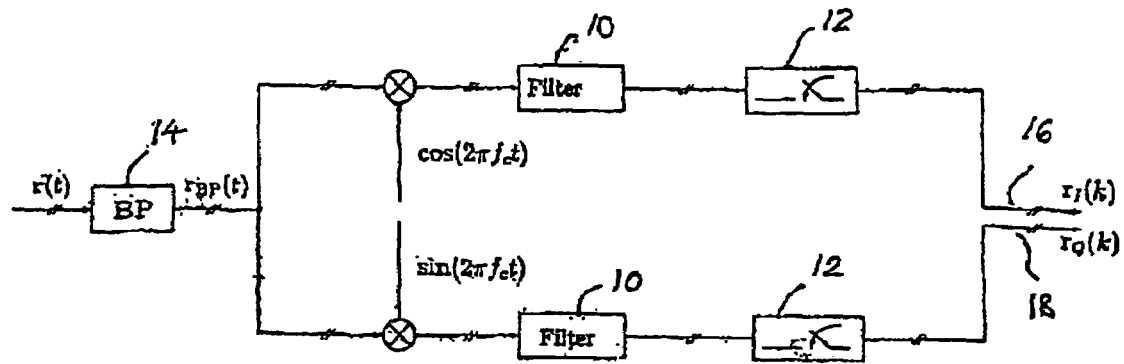
Fig. 1 "Prior Art"
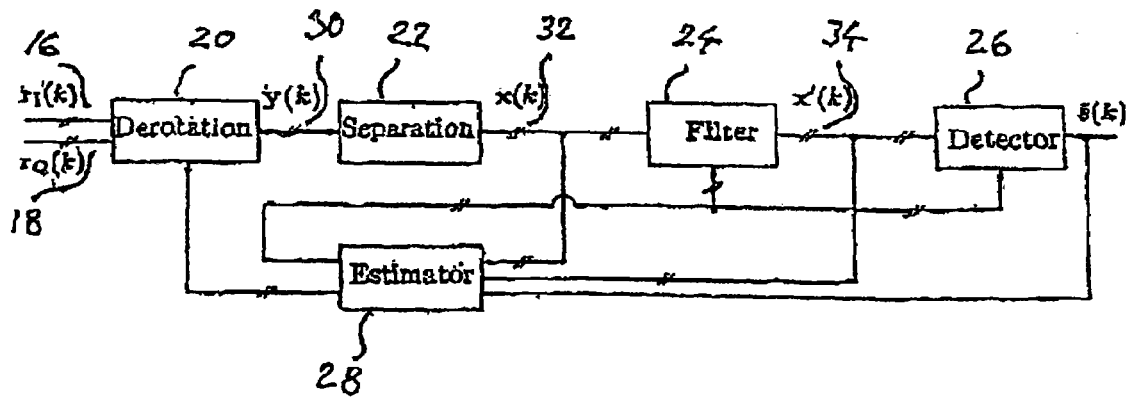
Fig. 2

RECEIVER

RELATED APPLICATIONS

This application is a continuation of U.S. patent application Ser. No. 10/296,964 filed on Jun. 19, 2003, which application is incorporated herein by reference.

FIELD OF THE INVENTION

The present invention relates to a method and a receiver for exploiting second order statistics for adaptive co-channel interference rejection in wireless communication.

BACKGROUND INFORMATION

Co-channel interference limits the number of simultaneous users in today's wireless systems; techniques for efficient co-channel interference rejection in wireless communication systems are of great importance. Recently, antenna arrays have been proposed to obtain extra degrees of freedom, so that spatio-temporal processing may be used for interference rejection. In some cases it is infeasible or unattractive to employ antenna arrays.

The increased number of users in wireless systems motivates the research in the area of interference rejection techniques. In order to suppress interfering co-channel signals some degree of freedom in the received signal is generally exploited. This freedom may be obtained by using multiple receiving antennas at the base station and/or by exploiting temporal structure in the communication signal.

Use of antenna arrays in wireless systems has been intensively investigated recently; see P. Zetterberg and B. Ottersten, "The spectrum efficiency of a basestation antenna array system for spatially selective transmission", IEEE Transactions on Vehicular Technology, 44(3): 651-660, August 1995, F. Pipon, P. Chevalier, P. Vila and J. -J. Monot, "Joint spatial and temporal equalisation for channels with ISI—theoretical and experimental results for a base station antenna array", in Conference proceedings of Signal Processing Advances in Wireless Communications (SPAWC), pages 309-312, Paris, April 1997 IEEE, or D. Asztély and B. Ottersten, "MLSE and spatio-temporal interference rejection combining with antenna arrays", in IX European Signal processing Conference (EUSIPCO-98), island of Rhodes, Greece, Sep. 8-11 1998.

Multi-dimensional antenna array signal processing is traditionally focused on utilising the spatial dimension present in array output data. The temporal dimension (delay-spread) has until recently been dealt with in separate circuits (channel equalisation). Combined temporal and spatial processing, as noted in D. T. M. Slock, "An interference cancelling multichannel matched filter", in Communications Theosy Mini-Conference in conjunction with Globecom, pages 214-218, New York, N.Y., 1996, IEEE and in A. J. Paulray and C. B. Papadias, "Space-time processing for wireless communications", IEEE Signal Processing Magazine, 14(6): 49-83, 1997, is advantageous when constructing highly efficient receiver methods for interference rejection. Drawbacks with antenna arrays are the increase in hardware and the difficulty to implement them on mobile stations. The present invention describes a method and a receiver for adaptive co-channel interference rejection using one or more antennas.

The method and the receiver according to the present invention are set forth through the attached independent claims. Further embodiments of the invention are set forth through attached dependent claims.

SUMMARY OF THE INVENTION

The present invention relates to a method and a receiver with a co-channel interference rejection scheme that exploits second order statistics for adaptive co-channel interference rejection in wireless communication. The invention claimed exploits the properties of certain signal constellations to obtain extra degrees of freedom that enable the application of powerful algorithms for interference rejection. This method may be applied to one or multiple coherent radio channels or one or more antennas. Examples of signal constellations include PAM, BPSK, MSK and also GMSK. Digitally I (in phase) and Q (quadrature) branches of a received transmitted signal are used as input to the receiver, a coarse synchronisation and a coarse frequency offset compensation have being performed on said signal. A receiver according to the invention claimed comprises means for derotation, means for separation, means for filtering, means for estimating and means for detecting transmitted symbols in the received signal.

Derotating the signal in said means for derotation outputs a complex valued time discrete base band representation of the received signal if a used modulation form is one dimensional. If a used modulation form is multiple dimensional, from possibly two vector valued signal sequences, a complex valued signal is separated in said means for separating it into its real and imaginary parts which vector is output from said means for separation containing the transmitted signal, co-channel interfering user signals, additive noise and other possible disturbance.

The method according to the invention claimed comprises the following steps: estimating in said means for estimation, using the outputs from said means for separation, means for filtering, from said means for detecting as input, and performing one or more of the following quantities: fine synchronisation, fine frequency offset estimation compensation, or data model estimation, outputting one or more of said quantities to said means for derotating, filtering and detecting.

Filtering in said means for filtering, uses the real valued output from said means for separation and coefficients in said data model output from the means for estimation and performing a whitening operation on the signal additionally taking into account the second order properties of noise and co-channel interference, the filtered signal being the output to the means for estimation and detection. Said filtering means perform a whitening operation that takes into account the second order statistical properties of the noise and co-channel interference.

Detecting transmitted symbols in said means for detecting, making use of the output from said means for filtering and the data model from the means for estimation, thereby improving co-channel rejection in wireless communication, thus making it possible to increase the number of frequencies used.

In one embodiment of the present invention the model for the communication channel is a linear FIR channel.

In another embodiment of the invention a model for interference and noise is a linear vector valued moving average process. In another embodiment a model for interference and noise is a vector valued autoregressive process.

A further embodiment of the present invention sequence estimation is performed on the whitened sequence using a filtered channel and a residual covariance matrix. In another embodiment detection is performed by taking a binary decision, symbol by symbol based on a scalar input signal. In yet another embodiment detection is performed by a reduced complexity sequence estimation performed on the whitened sequence. In yet another embodiment linear equalization is performed followed by symbol by symbol detection.

Data model parameters are in one embodiment of the invention estimated using training data. In another embodiment data model parameters are estimated using estimated symbols.

In a still further embodiment of the invention the model order is prespecifed. In another embodiment the model order is chosen according to a model order selection criteria. In yet another embodiment the model order is adapted during communication according to error rate on the channel.

In yet another embodiment multi models are estimated and used in the filtering and detection means, the model resulting in the lowest error rate providing the symbol estimates.

In a yet further embodiment of the invention timing estimation is performed on training data. In another embodiment timing estimation may be performed using estimated symbols. In yet another embodiment timing estimation is performed simultaneously as the data model parameter are estimated using training data.

A further embodiment provides that frequency offset estimation is performed on training data. In another embodiment frequency offset estimation may be performed using estimated symbols.

In yet another embodiment frequency offset estimation is performed simultaneously as the data model parameter are estimated using training data.

In another embodiment frequency offset estimation is performed on training data. Frequency offset estimation may be performed using estimated symbols.

In another embodiment frequency offset estimation is performed simultaneously as the datamodel parameters are estimated using training data.

In a still further embodiment said filtering means comprises a vector-valued linear IIR Infinite Impulse Response filter. Said filtering means performs a whitening operation that takes into account the second order statistical properties of the noise and co-channel interference. Multichannel maximum-likelihood sequence estimation may be performed by applying a Viterbi algorithm to the whitened sequence.

BRIEF DESCRIPTION OF THE DRAWINGS

FIG. 1 schematically illustrates a prior art receiver; and
FIG. 2 schematically illustrates a receiver according to the present invention.

DETAILED DESCRIPTION OF PREFERRED EMBODIMENTS OF THE INVENTION

The present invention relates to a method and a receiver with co-channel interference rejection scheme that exploits second order statistics for adaptive co-channel interference rejection in wireless communication. To illustrate the invention, a radio receiver for GSM is described. Extensions to other digital modulation schemes using signal constellations with the specified structure are included in the present invention. Communication signals are in general very structured, for example, the special temporal shape of a transmitted signal in Code Division Multiple Access schemes (CDMA), controlled by different user specific codes, used to separate concurrent channel users.

The communication signal is in this case thus extremely useful to suppress unwanted signals. Depending on timing offsets, signal strength, etc, the coding separates users more or less efficiently. Herein, time division multiple access systems are used to illustrated the invention. For CDMA systems that use signal constellations with the specified structure (for example BPSK), receivers with adaptive interference rejection according to this invention can also be implemented. It is also shown how the structure of Binary Phase Shift Keying (BPSK), Pulse Amplitude Modulation (PAM), Minimum Shift Keying (MSK) and Gaussian Minimum Shift Keying (GMSK) communication signals can be exploited to increase the number of processing degrees of freedom. It is shown that, starting with a one dimensional symbol sampled communication system, a two dimensional system may be obtained, see M. Kristensson, D. T. Slock and B. Ottersten, "Blind subspace identification of a BPSK communication channel", in Proceedings of the 30$^{th}$ Asilomar Conference on Signal, Systems and Computers, Pacific Grove, Calif., November 1996. This facilitates the use of powerful spatio-temporal algorithms when detecting the user of interest; this even when there is only one available antenna and no temporal oversampling is used.

FIG. 1 illustrates a procedure that is well known and used in most modern digital receivers. Actual implementation and order can take many forms, the filtering and down conversion being accomplished in stages, sometimes digitally. The figure displays an overview of the first analogue blocks in a radio receiver. These blocks filter 14, 10, down convert and sample 12 a received signal r(t).

In the present invention it is assumed that the digitally sampled I (in phase) and Q (quadrature) branches of the received signal, represented by $r_I(k)$ 16 and $r_Q(k)$ 18, are available in the receiver.

It is assumed according to the present invention that a coarse synchronisation and coarse frequency offset compensation have been performed. An index, k, represents time and is assumed to be symbol spaced. The quantities $r_I(k)$ and $r_Q(k)$ may be vector valued in case of multiple antennas and/or oversampling with respect to symbol time. The dimension of the vectors is equal to the product of the number of antennas and the oversampling factor. This is often referred to as the time discrete, digital base band communication signal. The sampling rate in this first block in the receiver can be faster than the symbol rate. Oversampling with respect to the symbol period is allowed.

Below, blocks in the digital receiver involved in the methods according to the present invention to exploit the modulation form for interference rejection are described. The following blocks are central to the invention and are depicted in FIG. 2.

Depending on the modulation for the transmitted signal, the Derotation block 20 functions in one of two ways.

First, if the transmitted modulation form is one dimensional, e.g. only needs one basis function to be described, then the output of the Derotation block 20 in FIG. 2, y(k) 30, is the complex valued time discrete base band representation of the received signal 16, 18. That is $$y(k)=r_I(k)+i\, r_Q(k)\ k=1,2,\qquad(1)$$

describes the possibly vector valued signal y. Here, i is the imaginary unit defined by $i^2=-1$. The quantity y(k) 30 is often referred to as the multi channel time discrete, digital base band communication signal. Examples of such modulation schemes are BPSK (Binary Phase Shift Keying) and one-dimensional amplitude modulation. If the transmitted modulation form is MSK or GMSK, then the input signals to the Derotation block are derotated. The derotation works as follows. First, form the two possibly vector valued sequences $$\bar{y}(k)=r_I(k)+i\, r_Q(k)\ k=1,2,\qquad(2)$$

is the complex valued sequence constructed. Then, the derotated sequence $$y(k) = i^{-k}\overline{y}(k), k=1, 2, \quad (3)$$

which is the output from the Derotation block 20 in the second case, is constructed.

The output of the Derotation block 20 in FIG. 2 is the input to a Separation block 22. The Separation block 22 separates the input signal in its real and imaginary parts:

$$x_r(k) = Re\{y(k)\},$$

$$x_i(k) = Im\{y(k)\} \quad (4, 5).$$

Here, $Re\{.\}$ and $Im\{.\}$ denote the real and imaginary parts of the indicated quantity, respectively. The vector, x(k) 32, formed from the real and imaginary parts of y(k) 30 is the output of the Separation block 22:

$$x(k) = \begin{bmatrix} x_r(k) \\ x_i(k) \end{bmatrix}. \quad (6)$$

The vector valued sequence x(k) 32 contains the transmitted signal, co-channel interfering users, additive noise and other disturbances.

An Estimator block 28 in FIG. 2, receives the outputs of the Separation 22, Filter 24, and Detector 26 blocks as inputs. Said Estimator block 28 performs one or more of the following: fine synchronisation, fine frequency offset estimation/compensation, data model estimation, estimation of channel and interference parameters. One or more of these quantities are outputted to the Derotation 20, Filter 24, and Detector 26 blocks. The estimation procedure uses knowledge about redundancy in the transmitted symbols to determine the unknown quantities. Redundancy in the transmitted symbol sequence can be in the form of a training sequence, a preamble, synchronisation symbols, known payload, etc. There are several embodiments possible of the Estimator and Detector blocks as described below. A Filtering block 24 receives as input the real valued vector, x(k) 32, from the Separation block 22, and the coefficients in the data model (h, W, Q) from the Estimator block.

The Filtering block 24 performs a multi channel whitening operation. This is not a traditional whitening filter as it takes into account to second order properties of the noise and co-channel interference. An output of the Filtering block 24 is input to the Detector 26 and Estimator 28 blocks.

A multi channel linear receiver that achieves interference rejection is described below. For sequence estimation, the time-discrete channel to the user of interest is modelled as an FIR-filter. Interference and noise are together modelled as a vector-valued autoregressive (VAR) system, see D. Asztély and B. Ottersten, "MLSE and spatio-temporal interference rejection combining with antenna arrays", in IX European Signal Processing Conference (EUSIPCP-98), Island of Rhodes, Greece, Sep. 8-11 1998 and R. A. Iltis, "A GLRT-based spread-spectrum receiver for joint channel estimation and interference suppression", IEEE Transactions on Communications, 37(3): 277-288, March, 1989. The importance of modelling the interference as temporally coloured, and non-circular, has been noted in, D. T. M. Slock, "An interference cancelling multichannel matched filter", in Communications Theory Mini-Conference in conjunction with Globecom, pages 309-312, Paris, April 1997, IEEE.

After whitening the received data samples, maximum-likelihood sequence detection, or reduced complexity sequence estimation, is performed by applying a Viterbi algorithm to the whitened sequence.

Novelty of the approach in accordance with the present invention lies in efficient combination of the receiver structure and the exploitation of the signal constellation. A gain with the approach compared to maximum-likelihood detection without exploiting the signal constellation is significant. Methods and ideas presented herein are thus applicable to receivers that do not employ antenna arrays and where the modulation waveform is non-circular. A GSM system, which is well known, is one such specific example.

In contrast to methods exploiting antenna arrays the method according to the invention claimed needs no change of hardware. The present invention can of course also be used to further enhance the performance of receivers using antenna arrays and/or temporal oversampling with respect to the symbol period. To enhance the performance of several blocks in the radio receiver the modulation scheme in several systems for mobile communication, like GSM, can be exploited. In environments where interfering users are the dominant disturbance term largest performance improvement is obtained.

In one embodiment, the multi channel Filter block 24 is a vector-valued linear IIR (Infinite Impulse Response) filter. In a preferred embodiment, the Filter block 24 is a multi-dimensional FIR filter with the Z-transform.

$$W(z) = I + \sum_{k=1}^{K} W(k)z^{-k}. \quad (7)$$

$$x'(k) = x(k) + \sum_{l=1}^{K} W(l)x(k-l). \quad (8)$$

The output of the filter is denoted with x'(k) 34. The filter performs the following operation:

Note that all the quantities above are real valued.

The Detector block receives as inputs x'(k) 34 from the Filter block 24 and the data model (h, W, Q) from the Estimator block 28. The outputs from the Detector block 26 are estimates of the transmitted symbols. The Detector block 26 can have several embodiments.

In one embodiment, taking a binary decision performs the detection; symbol by symbol based on a scalar input signal x'(k) 34, for example:

$$x'(k) \geq \text{a ``1'' was transmitted}$$

$$x'(k) < 0 \text{ a ``0'' was transmitted} \quad (9, 10)$$

In a preferred embodiment, a multi channel maximum likelihood sequence estimator (MLSE) is used for detection. It appropriately takes the data model, (h, W, Q) into account and produces as an estimate the most likely symbol. MLSE may be implemented with the well-known Viterbi algorithm or may be approximated with reduced complexity versions thereof.

Below, embodiments for the Estimator 28, Filter 24, and Detector 26 blocks are described. To simplify the development, a data model for the received signal is first introduced. A common linear model for the communication channels is, in the discrete time domain, a linear FIR channel from the transmitter to the receiver. This model for the vector and real valued signal x(k) is herein provided as $$x(k) = \sum_{l=0}^{M} h(l)s(k-l) + n(k), \quad (11)$$

where n(k) is the noise including receiver noise, model mismatch, and the interference from other users. Note that (11) is a real and vector valued description of a received communication signal. As is cleared out below, this description is more general and facilitates more interference suppression than a complex valued system with half the dimension. To detect the symbols of interest, s(k), the channel and the properties of the noise should preferably be known. Next, the noise properties are described.

The temporal correlation of noise term in (11) deserves special attention. Most often, this correlation is neglected. This is an appropriate model when no interference is present or when the delay-spread of the channel is small. However, when the delay spread is significant, the signal of the interfering users will, since they also satisfy an equation like (11), be temporally correlated. In one embodiment, the noise, n(k), is modelled as a vector-valued moving average (MA)-process with extra noise input. Once the parameters of the MA-process are estimated, n(k) is whitened and the transmitted sequence is estimated using the Viterbi algorithm on the whitened received sequence. This detector has excellent performance, however, the drawback with such a procedure is that the number of states in the Viterbi equaliser will grow without bound as the number of transmitted symbols increases. For long block lengths this is not a practical approach.

In the preferred embodiment, the interference and noise are modelled as a vector-valued autoregressive process of order K, VAR(K), according to $$n(k) + \sum_{l=1}^{K} W(l)n(k-l) = e(k), \quad (12)$$

where e(k) is a temporally white and Gaussian distributed process with spatial covariance $$E\{e(t)e^T(t)\} = Q \quad (13).$$

In one embodiment, the model order is determined using one of several well-known model order selection criteria. In an alternative embodiment, the model order is a receiver design parameter and is fixed to a prespecified value. In yet another embodiment, the model order is adapted during communication according to the bit error rate on the channel. In yet another embodiment, multi models are estimated and used in the filtering and detection stages, the model that gives the lowest bit error performance will produce the symbol estimates.

Bit error performance can be evaluated by error detection and/or error correction codes, which are common in digital communication systems.

The above noise model is of course only an approximation of the real environment with noise and interference. The advantage with this particular choice of noise model is that the detection of the symbols is relatively straightforward.

A maximum likelihood approach to estimate the transmitted symbols assumes knowledge of the parameters in the model. Here, it is outlined how to estimate the parameters in a system with a known symbol sequence, for example, a training sequence. During the training sequence both the channel and noise parameters are to be estimated. The assumptions made on the communication system is that the signal of interest and the interferers are burst synchronised and that the scenario is time-invariant so that the parameters estimated during the training period are valid throughout the complete information burst.

An example of such a system is a GSM system where the base stations are synchronised. It is of course possible to use the described receiver for the case of unsynchronised base stations, some loss in performance will be experienced. It is also possible to extend the method to handle the case of unsynchronised base stations as well. However, in that case the VAR-model needs to be updated recursively during the information burst. Adaptive estimation procedures for the VAR-model are known in the art.

To outline the estimation procedure equations (26, 27) and (31) below are combined and the relation $$x(k) + \sum_{l=1}^{K} W(l)x(k-l) = Hs(k) + n(k). \quad (14)$$

Note, that the relation is linear both in W(1), ..., W(K) and H. Measured received sequence x(k) and the data symbols s(k) are both known quantities during the training sequence. This results in a simple least squares fit when simultaneously estimating the VAR-parameters in W(1), ..., W(K) and the channel coefficients in H.

$$\{\hat{W}, \hat{H}\} = \operatorname*{argmin}_{W,H} \sum_{k=1}^{N} \left\| x(k) + \sum_{l=1}^{K} W(l)x(k-l) - Hs(k) \right\|^2 \quad (15, 16)$$

$$= \operatorname*{argmin}_{W,H} \sum_{k=1}^{N} \|\varepsilon(k)\|^2$$

where N is the number of samples for which the minimisation is performed and W denotes the model parameters W(1), ..., W(K). An estimate of Q is given by the sample covariance of the residual, $\square$(k).

$$\hat{Q} = \frac{1}{N} \sum_{k=1}^{N} \varepsilon(k)\varepsilon^T(k) \quad (17)$$

In most systems the transmitter and receiver frequencies differ slightly. Since this disturbs the receiver, this frequency offset must be estimated and compensated for. It is assumed that the signals, $r_I(k)$ and $r_Q(k)$ have a coarse frequency offset compensation according to what is known in the art. Fine frequency offset estimation can be performed in the Estimator block. Output from the Filter block 24 will have reduced interference and thus, this method will perform better than methods that do not take interference into account. Similarly to (6) the vector x'(k) is partitioned and denoted:

$$x'(k) = \begin{bmatrix} x'_r(k) \\ x'_i(k) \end{bmatrix}. \quad (18)$$

Similarly, the following notation is introduced corresponding to the partitioned equation (14):

$$\begin{bmatrix} x'_r(k) \\ x'_i(k) \end{bmatrix} = x(k) + \sum_{l=1}^{K} W(l)x(k-l) = \begin{bmatrix} H_r s(k) \\ H_i s(k) \end{bmatrix} + n(k) \quad (19)$$

An estimate of the frequency offset, $w_0$, may now be obtained by minimising $$\hat{\omega}_0 = \underset{\omega_0}{\operatorname{argmin}} \sum_{k=1}^{N'} \left\| \begin{bmatrix} x'_r(k) \\ x'_i(k) \end{bmatrix} - \begin{bmatrix} H_r \hat{s}(k)\cos(\omega_0 k) \\ H_i \hat{s}(k)\sin(\omega_0 k) \end{bmatrix} \right\|^2 \quad (20)$$

where N' is the batch of data over which the minimisation is performed. In one embodiment, the channel matrices $H_r$ and $H_i$ in (20) are partitioned from the estimated channel matrix obtained from the channel estimation procedure, the filtering matrices W are obtained from the channel estimation procedure, and the estimated symbols are the output of the Detector block.

In an alternative embodiment, the minimisation is performed using the training data. In this case the minimisation is performed simultaneously over W, $H_r$, $H_i$ and $\square_0$ As an alternative, the frequency-offset estimation is performed on training data assuming a trivial channel and filter (identity operation). In yet another embodiment, the frequency-offset estimate is adaptively estimated using well-known adaptive versions of the criteria above. In general the adaptation rate of the frequency-offset estimate is slower than that of the data model parameters. The frequency offset can be compensated for in the Derotation block 20 by letting $$y(k) = (r_I(k) + ir_Q(k))e^{-iw_0 k} \, k=1, 2, \quad (22)$$

Synchronisation or timing estimation must be performed to be able to perform data detection. It is assumed that the signals, $r_I(k)$ and $r_Q(k)$ are coarsely synchronised, i.e., the location of the training data is roughly known. This coarse synchronisation is performed as is well known in the art.

A fine timing estimation can be performed in the Estimation block. Output from the Filter block will have reduced interference and thus, this method will perform better than methods that do not take interference into account. An estimate of the timing, $\square_0$, may now be obtained by minimising $$\hat{\tau}_0 = \underset{\tau_0}{\operatorname{argmin}} \sum_{k=1}^{N'} \|x'(k, \tau_0) - H\hat{s}(k)\|^2 \quad (23)$$

where N' is the batch of data over which the minimisation is performed. In one embodiment, the channel matrix H and the filtering matrices W in (23) are obtained from the channel estimation procedure with the coarse timing. The estimated symbols in (23) are the output of the Detector block 26.

In an alternative embodiment of the present invention, the timing estimation is performed using the training data. In this case the minimisation is performed simultaneously over W, H and $\square_0$.

$$\underset{W,H,\tau_0}{\min} \sum_{k=1}^{N} \left\| x(k, \tau_0) + \sum_{l=1}^{K} W(l)x(k-l, \tau_0) - Hs(k) \right\|^2 \quad (24)$$

As an alternative, the timing estimation is performed on training data assuming a trivial channel and filter (identity operation). In yet another embodiment, the timing is adaptively estimated using well-known adaptive versions of the criteria above. In general the adaptation rate of the timing estimate is slower than that of the data model parameters. In this and the following section it is assumed that the coefficients in the data model (h, W, Q) are known/estimated and the notation ^ will be omitted.

As mentioned earlier, in one embodiment, the detector consists of a temporal whitening filter followed by a MLSE constructed for a temporally white noise process. Because the noise and interference are modelled together as a VAR-process, the whitening filter is a multi-dimensional FIR filter with the Z-transform $$W(z) = I + \sum_{k=1}^{K} W(k)z^{-k}. \quad (25)$$

To formulate the whitened process mathematically, denote the output of the whitening filter with x'(k), that is, $$x'(k) = x(k) + \sum_{l=1}^{K} W(l) \times (k-l). \quad (26)$$

$$h'(k) = \sum_{l=0}^{K} W(l)h(k-l), k=0, \ldots, M+K, \quad (28)$$

The output of the whitening filter satisfies the equation $$x'(k) = \sum_{l=0}^{M+K} h'(l)s(k-l) + e(k), \quad (27)$$

where e(k) is the process noise in the VAR-model of the disturbance. The new channel, h', is of order M+K and is the convolution of the original channel with the VAR-model. Hence, the new channel h' is where W(0)=I. Note that the new channel is a finite order multi-dimensional FIR-filter. This concludes the discussion of the whitening of the received data.

To formulate the MLSE we construct the 2×(M+K) channel matrix H according to $$H' = [h'(0) \ldots h'(M+K)] \quad (29)$$

and the symbol vector $$s(k) = [s(k) \ldots s(k-M-K)]^T \quad (30).$$

With these notations the whitened two-dimensional system in (27) is compactly written $$x'(k) = H's(k) + e(k) \quad (31).$$

Finally, the maximum likelihood estimate of the received sequence is $$\{\hat{s}(k)\} = \underset{\{s(k)\}}{\operatorname{argmin}} \sum_l (x'(l) - H's(l))^T Q^{-1}(x'(l) - H's(l)). \qquad (32)$$

Summation is done for all the symbols s(l) to detect and also including parts of the training data (if available) to provide initial and/or final conditions. Minimisation is preferably performed with the Viterbi algorithm, which is well known in the art.

Outputs from the detector, s(k) are either hard or soft estimates of the input data symbols, s. These hard or soft decisions are used in the deinterleaving, error correction/detection before the final information symbols are estimated.

The invention claimed is:

1. A method comprising:
receiving branches of transmitted signal by a digital receiver exploiting second order statistics for adaptive co-channel interference rejection in wireless communication, having digitally I, in phase, and Q, quadrature, wherein a coarse synchronization and a coarse frequency offset compensation are configured to be performed on said signal,
derotating the signal, and outputting a complex valued time discrete base band representation of the received signal if a used modulation form is one dimensional, else if a used modulation form is multiple dimensional then construct, from possibly two vector valued signal sequences, a complex valued signal sequence and outputting said complex valued signal;
separating said output signal into its real and imaginary parts which vector is output containing the transmitted signal, co-channel interfering user signals, additive noise and other possible disturbance;
estimating using the outputs and performing one or more of the following quantities: fine synchronisation, fine frequency offset estimation or compensation, or data model estimation for outputting one or more of said quantities;
filtering, using the real value output and coefficients in the data model output and performing a whitening operation on the signal additionally taking into account second order properties of noise and co-channel interference; and
detecting transmitted symbols, and making use of the output and the data model, thereby improving co-channel rejection in wireless communication, thus making it possible to increase the number of channels for frequencies used.

2. A method according to claim 1, wherein said method performs a whitening operation that takes into account the second order statistical properties of the noise and co-channel interference.

3. A method according to claim 1, wherein detection is performed by taking a binary decision, symbol by symbol based on a scalar input signal.

4. A method according to claim 1, wherein linear equalization is performed followed by symbol by symbol detection.

5. A method according to claim 1, wherein sequence estimation is performed on the whitened sequence.

6. A method according to claim 5, wherein the sequence estimation is performed by using a filtered channel and a residual covariance matrix.

7. A method according to claim 1, wherein detection is performed by a reduced complexity sequence estimation performed on the whitened sequence.

8. A method according to claim 1, wherein a model for a communication channel is a linear FIR channel.

9. A method according to claim 1, wherein a model for interference and noise is a linear vector valued moving average process.

10. A method according to claim 1, wherein a model for interference and noise is a vector-valued autoregressive process.

11. A method according to claim 1, wherein data model parameters are estimated using training data.

12. A method according to claim 1, wherein data model parameters are estimated using estimated symbols.

13. A method according to claim 1, wherein the model order is prespecified.

14. A method according to claim 1, wherein the model order is chosen according to a model order selection criteria.

15. A method according to claim 1, wherein the model order is adapted during communication according to error rate on the channel.

16. A method according to claim 1, wherein multi models are estimated and used in the filtering and detection means, the model resulting in the lowest error rate providing the symbol estimates.

17. A method according to claim 1, wherein timing estimation is performed on training data.

18. A method according to claim 1, wherein timing estimation is performed using estimated symbols.

19. A method according to claim 1, wherein timing estimation is performed simultaneously as the data model parameters are estimated using training data.

20. A method according to claim 1, wherein frequency offset estimation is performed on training data.

21. A method according to claim 1, wherein frequency offset estimation is performed using estimated symbols.

22. A method according to claim 1, wherein frequency offset estimation is performed simultaneously as the data model parameters are estimated using training data.

23. A receiver,
wherein the receiver is configured to exploite second order statistics for adaptive co-channel interference rejection in wireless communication, having digitally I, in phase, and Q, quadrature, branches of a received transmitted signal as input to the receiver, a coarse synchronisation and a coarse frequency offset compensation have configured to be performed on said signal, the receiver comprising:
derotation block for derotating the signal, and outputting a complex valued time discrete base band representation of the received signal if a used modulation form is one dimensional, else if a used modulation form is multiple dimensional then construct, from possibly two vector valued signal sequences, a complex valued signal sequence and outputting said complex valued signal;
separation block for separating the derotated output signal into its real and imaginary parts which vector is output from said separation block containing the transmitted signal, cochannel interfering user signals, additive noise and other possible disturbance;
estimator block using the outputs from said separation block, filter block, and from detector block, and performing on one or more of the following quantities: fine synchronisation, fine frequency offset estimation or compensation, or data model estimation for outputting one or more of said quantities to said derotation block, filter block, detector block;
the filter block using the real value output from said separation block and coefficients in the data model output from the estimator block and performing a whitening operation on the signal additionally taking into account a second order properties of noise and co-channel interference, the filtered signal being output to the estimator block and detector block; and detector block for transmitted symbols in the signal, making use of the output from said filter block and the data model from the estimator block, thereby improving cochannel rejection in wireless communication, thus making it possible to increase the number of communication channels for frequencies used.

24. A receiver according to claim 23, wherein said filter block perform a whitening operation that takes into account the second order statistical properties of the noise and co-channel interference.

25. A receiver according to claim 23, wherein detection is performed by taking a binary decision, symbol by symbol based on a scalar input signal.

26. A receiver according to claim 23, wherein linear equalization is performed followed by symbol by symbol detection.

27. A receiver according to claim 23, wherein a sequence estimation is performed on the whitened sequence.

28. A receiver according to claim 27, wherein the sequence estimation is performed by using a filtered channel and a residual covariance matrix.

29. A receiver according to claim 23, wherein detection is performed by a reduced complexity sequence estimation performed on the whitened sequence.

30. A receiver according to claim 23, wherein a model for a communication channel is a linear FIR channel.

31. A receiver according to claim 23, wherein a model for interference and noise is a linear vector valued moving average process.

32. A receiver according to claim 23, wherein a model for interference and noise is a vector-valued autoregressive process.

33. A receiver according to claim 23, wherein data model parameters are estimated using training data.

34. A receiver according to claim 23, wherein data model parameters are estimated using estimated symbols.

35. A receiver according to claim 23, wherein the model order is prespecified.

36. A receiver according to claim 23, wherein the model order is chosen according to a model order selection criteria.

37. A receiver according to claim 23, wherein the model order is adapted during communication according to error rate on the channel.

38. A receiver according to claim 23, wherein multi models are estimated and used in the filtering and detection means, the model resulting in the lowest error rate providing the symbol estimates.

39. A receiver according to claim 23, wherein timing estimation is performed on training data.

40. A receiver according to claim 23, wherein timing estimation is performed using estimated symbols.

41. A receiver according to claim 23, wherein timing estimation is performed simultaneously as the data model parameters are estimated using training data.

42. A receiver according to claim 23, wherein frequency offset estimation is performed on training data.

43. A receiver according to claim 23, wherein frequency offset estimation is performed using estimated symbols.

44. A receiver according to claim 23, wherein frequency offset estimation is performed simultaneously as the data model parameters art estimated using training data.

* * * * *